Feb. 23, 1971     J. F. HUTTO ET AL     3,565,969
CONVERSION OF MIXED BUTENES TO ISOAMYLENES
Filed April 18, 1968     2 Sheets-Sheet 1

INVENTORS
J. F. HUTTO
R. E. DIXON
BY
ATTORNEYS

United States Patent Office 3,565,969
Patented Feb. 23, 1971

3,565,969
CONVERSION OF MIXED BUTENES TO ISOAMYLENES
John F. Hutto and Rolland E. Dixon, Bartlesville, Okla., assignors to Phillips Petroleum Company, a corporation of Delaware
Filed Apr. 18, 1968, Ser. No. 722,397
Int. Cl. C07c 3/62
U.S. Cl. 260—683        6 Claims

ABSTRACT OF THE DISCLOSURE

Normal butenes and isobutene are converted by a first olefin reaction to produce isoamylenes and a heavier branched olefin, and the heavier branched olefin is converted, together with ethylene, in a second olefin reaction zone, to produce additional isoamylenes.

---

Figure 1:
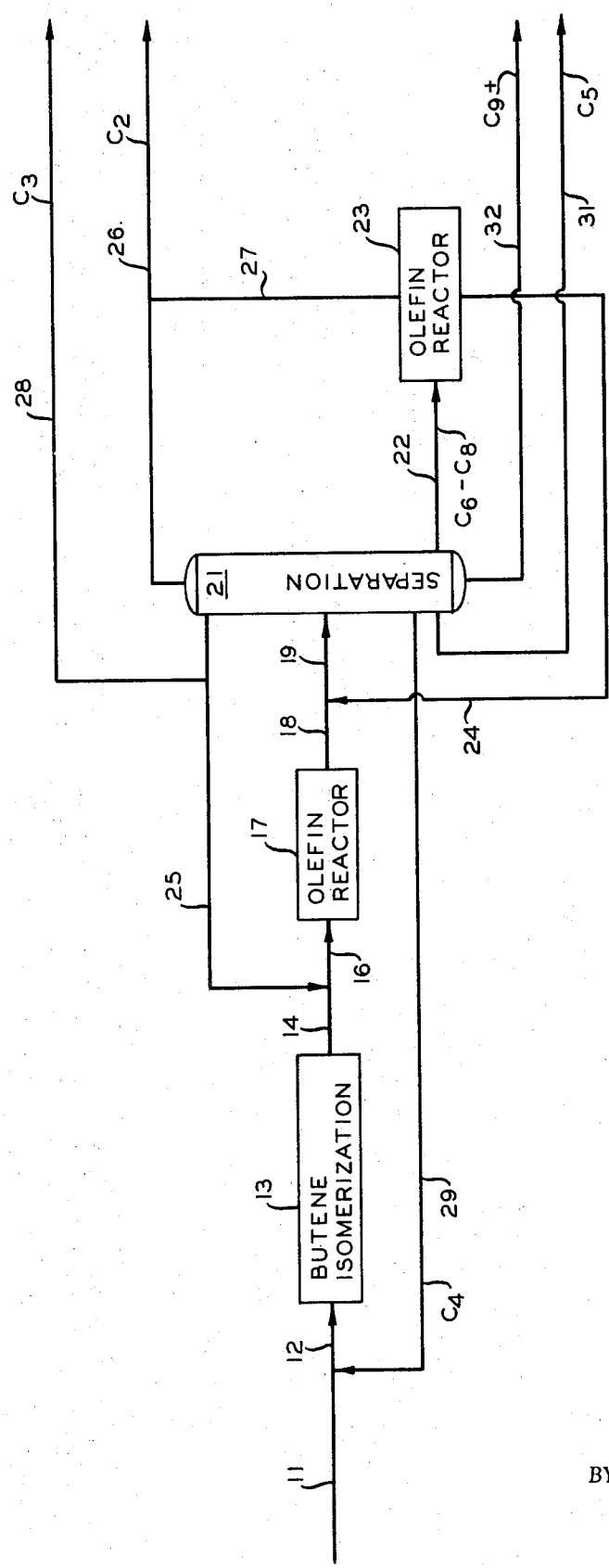

This invention relates to the production of isoamylenes from mixed butenes. In one aspect it relates to a process for the production of isoamylenes from mixed butenes using a plurality of olefin reaction steps. In another aspect, the invention relates to the production of isoprene from mixed normal and isobutenes raw material.

In many instances, it is desirable to convert one acyclic olefin hydrocarbon to produce another acyclic olefin hydrocarbon. For example, isoamylene, which is a valuable intermediate for the production of isoprene, is a desirable product to produce from a relatively inexpensive and readily available feed stock, such as mixed butenes. In some instances, it is desirable to have a process for the conversion of mixed butenes to produce isoprene which can be polymerized to produce desirable products.

An object of the invention is to produce isoamylenes from mixed butenes. Another object of the invention is to produce isoprene from mixed butenes. Other aspects, objects and the advantages of the invention are apparent in the written description, the drawing, and the claims.

According to the invention, mixed normal butenes and isobutene are converted in a first olefin reaction zone to produce isoamylenes and a heavier branched olefin by-product, and the heavier branched olefin by-product is converted in a second olefin reaction zone in the presence of ethylene to produce additional isoamylenes, as well as additional isobutene for use in the first olefin reaction zone. Further according to the invention, produced isoamylenes are converted to isoprene.

The term "olefin reaction," as used herein, is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or in different molecules.

The olefin reaction, as used in the present invention, is illustrated by the following reactions:

(1) The disproportionation of an acyclic mono- or polyene having at least 3 carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of butene-2 and isobutylene yields propylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium, or tellurium, or by a sulfide of tungsten or molybdenum;

(2) Alumina promoted by an oxide or compound convertible to an oxide by calcination or molybdenum, tungsten, or rhenium; by a sulfide of tungsten or molybdenum; or by an alkali metal salt, ammonium salt, alkaline earth metal salt, or bismuth of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten, or rhenium or by magnesium tungstate or beryllium phosphotungstate;

(4) Silica, alumina, zirconia, aluminum phosphate, zirconium phosphate, calcium phosphate, magnesium phosphate, or titanium phosphate promoted by a hexacarbonyl of molybdenum or tungsten; and (5) Homogeneous olefin reaction catalysts can be used where appropriate. In such embodiments, catalyst removal and/or recovery steps normally are required. For example, transition metal-containing homogenous catalyst systems, active for the disproportionation of olefins, can be used. An example of one such catalyst system is bis(triphenylphosphine)dinitrosyldichloromolybdenum and methylaluminum sesquichloride which can be used at atmospheric pressure, room temperature, and preferably in the presence of a reaction diluent. Some suitable homogeneous catalyst system are disclosed and claimed in U.S. Ser. Nos. 635,649, 635,657, 635,669, now abandoned; 635,693, now abandoned; 635,708, filed May 3, 1967; 694,872, now abandoned; 694,873, 694,874, filed Jan. 2, 1968; and 696,109, filed Jan. 8, 1968.

The catalysts of (1) can be prepared and activated by conventional techniques, such as by combining a catalyst grade silica with a suitable tungsten, molybdenum, rhenium, or tellurium, compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant such as, for example, an organoaluminum halide, under conditions suitable to provide a catalyst active for the olefin reaction.

The catalystic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the puressure is in the range of 0 to 2000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

Depending upon the specific feed materials and the specific catalysts being used, any conventional contacting technique can be utilized, such as fixed bed reaction, fluidized bed reaction, liquid phase batch reaction, and the like.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an erization catalyst. In one such system, the olefin feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

At the completion of the reaction, the reaction mixture can be processed to recover any desired product by any conventional means such as fractionation, crystallization, adsorption, and the like. Unreacted material or products not in the desired molecular weight range can be recycled.

Figure 2:
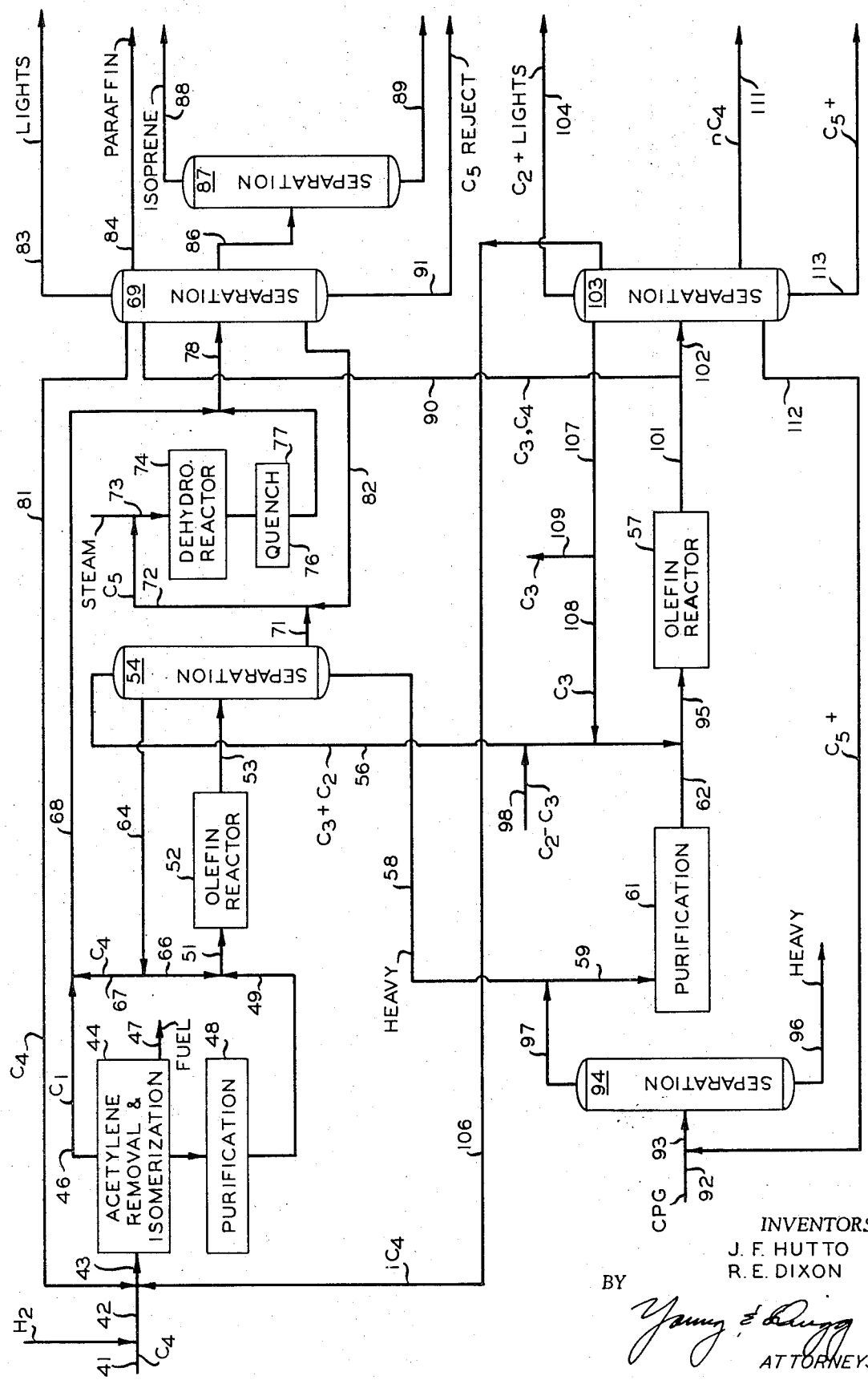

In the drawing, FIG. 1 is a simplified schematic representation of an embodiment of the invention for the production of isoamylene. FIG. 2 is a simplified schematic representation of an embodiment of the invention including the production of isoprene.

Referring to FIG. 1, a feed stream comprising normal butenes and isobutene, preferably containing 50 or more mole percent isobutene, is fed through pipe 11 and pipe 12 into butene isomerization zone 13. Isomerization zone 13 is for the purpose of converting butene-1 to butene-2. Alternatively, butene isomerization zone 13 can be omitted or an isomerization component can be included in the catalyst in the first olefin reaction.

The effluent from butene isomerization zone 13 is fed through pipe 14 and pipe 16 into olefin reaction zone 17. In reaction zone 17 an appreciable quantity of isoamylene is produced along with appreciable quantities of ethylene and propylene. The effluent is fed through pipe 18 and pipe 19 to separation zone 21. $C_6$–$C_8$ olefins are fed from separation zone 21 through pipe 22 to olefin reactor 23. The affluent from olefin reactor 23, comprising additional isoamylenes and butenes is returned to separation zone 21 through pipe 24 and pipe 19. Propylene is recycled to reactor 17 through pipe 25 and/or removed from the system through pipe 28. Ethylene is removed from separation zone 21 and passed to olefin reactor 23 through pipe 27, any excess ethylene being removed through pipe 26. If desired, at least a portion of the propylene produced can be passed to olefin reactor 23 along with ethylene. In general, from about 1–10, preferably 2–5, moles of ethylene or ethylene-propylene mixture are contacted with each mole of $C_6$–$C_8$ olefin in the olefin reactor 23.

$C_4$ olefins are recycled from separation zone 21 to olefin reaction zone 17 through pipe 29, the stream passing through butene isomerization zone 13, if desired. $C_5$ olefins are removed through pipe 31 for recovery of isoamylenes and, if desired, a heavy stream, e.g., $C_9+$, is removed through pipe 32.

In FIG. 2, the feed stream of mixed butenes, preferably containing about 50 or more mole per cent isobutene, enters through pipe 41 and passes through pipes 42 and 43 into acetylene removal and isomerization zone 44. The acetylenes, primarily $C_4$ acetylenes, are present only in trace quantities. In zone 44 there is a catalytic hydrogenation to convert acetylenes to olefins and alkanes and a catalytic isomerization to convert butene-1 to butene-2. Any suitable catalyst system for the selective hydrogenation of acetylene and the isomerization of butene-1 to butene-2 can be used, for example, two consecutive beds of catalyst. The feed stream may need to be deoiled and demethanized and, if so, this is done in a separation zone included within zone 44, downstream of the hydrogenation and isomerization steps, thus removing not only undesirable light and heavy materials in the feed stream but also any produced in either of the catalytic steps. Thus, the stream removed through pipe 46 is for the removal of methane, unconverted hydrogen or other such light materials while the stream removed through pipe 47 is primarily very small quantities of $C_6+$ hydrocarbons.

The butenes stream, enriched in butene-2, is passed into purification zone 48. Purification zone 48 can comprise, for example, drying and any other desired purification step. In the operation of the invention, it is often desirable to include a purification step which comprises passing the stream through a magnesia bed at or near ambient temperature. Such purification is disclosed and claimed in Ser. No. 627,635, filed Apr. 3, 1967. The effluent from purification zone 48 is passed through pipe 49 and pipe 51 into olefin reactor 52. In olefin reactor 52, substantial quantities of isomylenes, as well as ethylene and propylene, are produced and the effluent is passed through pipe 53 into separation zone 54. Ethylene and propylene from zone 54 are passed through pipe 56 to add to the feed to olefin reactor 57. Heavier olefins, for example, olefins heavier than $C_5$, are passed through pipe 58, pipe 59, purification zone 61 and pipes 62 and 95 to olefin reactor 57. Purification zone 61 is similar to purification zone 48.

$C_4$ olefins are recycled from separator 54 through pipe 64 and pipe 66 to olefin reactor 52, a small portion of the stream being passed through pipe 67 and pipe 68 to separation zone 69 to prevent build-up of paraffin hydrocarbons in this boiling range.

$C_5$ olefins are passed through pipe 71, pipe 72 and pipe 73 into dehydrogenation reactor 74, wherein isoamylenes are converted to isoprene. Any suitable catalyst can be used in zone 74 for the dehydrogenation of isoamylene to produce isoprene. Such catalysts and conditions are known in the art and need not be set forth in explicit detail at this point.

The effluent from reaction zone 74 is quenched in zone 76 and passed through pipe 77 and pipe 78 into separation zone 69. From separation zone 69, $C_4$ olefins which may also contain some propylene are returned through pipe 81 for further reaction in olefin reactor 52 and $C_5$ olefins are returned through pipe 82 for further reaction in dehydrogenation reaction zone 74. A light hydrocarbon stream, e.g., one containing $H_2$, CO, $CO_2$, $CH_4$, some propylene, etc., is removed through pipe 83. Paraffins are bled off through pipe 84. The isoprene product stream is removed from separation zone 69 through pipe 86 and passed to a further separation zone 87 from which the product isoprene stream is removed through pipe 88 and a small quantity of heavied hydrocarbons, e.g., isoamylene, piperylene, $C_6$, are removed through pipe 89. A mixed stream of $C_3$, $C_4$ olefins is passed from separator 69 through pipe 90 to separator 103. A $C_5$ reject stream including, for example, piperylenes and trace amounts of cyclopentadiene, is removed through pipe 91.

A cat poly gasoline stream enters through pipe 92 and passes through pipe 93 into separation zone 94. Cat poly gasoline is the conventional mixture of branched olefins up to about $C_{12}$ produced by the polymerization of mixtures of lower olefins such as mixtures of propylene and butenes. Other suitable stream containing branched olefins can be fed at this point, either in addition to or in place of the cat poly gasoline. From separation zone 94, a heavy stream, comprising heavy saturated materials, is removed through pipe 96. Olefins from the cat poly gasoline stream are passed through pipe 97 and combined with the stream in pipe 58 and passed through pipe 59 into purification zone 61.

If desired, additional ethylene and propylene can be fed through pipe 98. From about 1–10, preferably 2–5, moles of ethylene and propylene mixture are used to contact each mole of heavy olefin in reactor 57. In olefin reactor 57 the quantity of heavy olefins is reduced and the quantity of intermediate olefins, e.g., normal and isobutenes, is increased. The effluent from reactor 57 is passed through pipe 101 and pipe 102 to separation zone 103. From separation zone 103, $C_2$ and lighter products are removed through pipe 104, isobutene is recycled through pipe 106 for further reaction in olefin reactor 52, propylene is recycled through pipe 107 to olefin reactor 57, via pipe 108, or for removal from the system, through pipe 109. Normal butenes are removed through pipe 111. $C_5+$ olefins are recycled through pipe 112 while a small $C_5+$ stream, containing saturated $C_5+$ hydrocarbons, is removed through pipe 113 to prevent build-up of heavy paraffins.

EXAMPLE

In an example according to the invention as illustrated in FIG. 2, acetylene removal and isomerization zone 44 comprise separate acetylene hydrogenation and butene isomerization zones. A separation is made after the isomerization step for removal of light and heavy hydrocarbons. In the acetylene removal section, the catalyst is ammonium phosphomolybdate on alumina. The reaction is carried out at atmospheric pressure and a temperature of 630° F., and at a gaseous feed rate of 300 volumes feed per volume of catalyst per hour (v./v./hr.). Following this step, the effluent is passed through a butene isomerization zone to isomerize butene-1 to butene-2. In this zone, the catalyst is boron trifluoride modified substantially anhydrous alumina, the temperature is 200° F. the pressure is 100 p.s.i.g., and the rate is 1500 v./v./hr. Following the isomerization step, the stream is deoiled to remove a hydrocarbon stream which can be used as fuel and stripped to remove methane. The stream then passes through a purification zone wherein it is dried over a molecular sieve drier followed by a purification treatment with magnesium oxide. The stream passes through the magnesium oxide treatment at ambient temperature. Following the drying and purification, the stream then passes to olefin reactor 52 which contains a tungsten oxide on silica (8 percent $WO_3$) olefin reaction catalyst. The temperature is 880° F., the pressure is 450 p.s.i.a. and the rate 50 WHSV. Olefin reaction 57 is operated under similar conditions.

In dehydrogenation reactor 74, the catalyst is a mixture comprising 45 weight percent $Fe_2O_3$, 52 percent $K_2CO_3$, and 3 weight percent $Cr_2O_3$, the temperature is 1325° F., the pressure is 35 p.s.i.a. and the rate is 400 WHSV (weight feed per weight of catalyst per hour).

All temperatures and pressures in this example are measured at the reaction zone inlet.

In purification zone 61 there is a mol sieve dried followed by a magnesium oxide purification zone. The purification step is carried out at ambient temperature. In olefin reaction zone 57, the catalyst comprises a mixed bed of a tungsten oxide on silica (8 weight percent $WO_3$) olefin reaction catalyst and magnesium oxide, 1 part by weight of the olefin reaction catalyst to 7.5 parts by weight of magnesium oxide. The temperature is 800° F., the pressure is 450 p.s.i.a. and the rate is 50 WHSV, based on the amount of olefin reaction catalyst.

In the table are typical compositions of various streams in the process.

omitted from the description of the invention for simplicity.

TABLE

|  | 41 | 43 | 46 | 49 | 53 | 56 | 58 | 67 | 66 |
|---|---|---|---|---|---|---|---|---|---|
| Hydrogen | 0 | 41.47 | 0.41 | 0 | 1.12 | 1.12 | 0 | 0 | 0 |
| Methane | 2.25 | 12.78 | 11.10 | 1.67 | 3.05 | 3.05 | 0 | 0 | 0 |
| Ethylene | 0 | 0.11 | 0.09 | 0.02 | 415.53 | 415.30 | 0 | 0.023 | 0.21 |
| Ethane | 0 | 0.43 | 0.35 | 0.08 | 0.62 | 0.61 | 0 | 0.001 | 0.01 |
| Propylene | 0.43 | 154.61 | 21.97 | 132.64 | 1,179.97 | 688.40 | 0 | 49.158 | 442.42 |
| Propane | 0.05 | 31.60 | 4.42 | 27.17 | 63.92 | 29.90 | 0 | 3.402 | 30.62 |
| Isobutane | 5.19 | 17.26 | 1.99 | 22.86 | 253.32 | 1.56 | 0 | 25.173 | 226.56 |
| Isobutylene | 285.62 | 1,098.89 | 56.78 | 1,033.18 | 938.33 | 0.95 | 0 | 93.719 | 843.47 |
| Butene-1 | 201.94 | 530.35 | 6.06 | 115.10 | 71.90 | 0.05 | 0 | 7.184 | 64.66 |
| Butadiene | 10.43 | 25.42 | 0 | 0 | 0.01 | 0 | 0 | 0.001 | 0.01 |
| Normal butane | 44.02 | 73.02 | 3.78 | 76.60 | 751.43 | 0.14 | 0 | 74.927 | 674.34 |
| Butene-2 | 105.50 | 554.98 | 42.26 | 936.78 | 583.10 | 0.04 | 0 | 57.887 | 520.09 |
| Isopentane | 0.02 | 0.65 | 0.03 | 0.60 | 0.66 | 0 | 0 | 0.007 | 0.06 |
| Isoprene | 0 | 0.50 | 0 | 0 | 0 | 0 | 0 | 0 | 0 |
| Normal pentane | 0.03 | 0.03 | 0 | 0.03 | 0.03 | 0 | 0 | 0 | 0 |
| Normal pentenes | 0.04 | 7.94 | 0.20 | 7.50 | 100.65 | 0 | 0.76 | 0.161 | 1.45 |
| Isopentenes | 0.06 | 4.06 | 0.11 | 4.29 | 766.97 | 0 | 9.27 | 3.091 | 27.82 |
| Piperylenes | 0 | 0 | 0 | 0 | 0 | 0 | 0 | 0 | 0 |
| Hexenes | 5.66 | 6.59 | 0.01 | 0.60 | 113.51 | 0 | 112.40 | 0 | 0 |
| Heptenes | 0.05 | 0.13 | 0 | 0 | 19.32 | 0 | 19.32 | 0 | 0 |
| Octenes | 0 | 0.01 | 0 | 0 | 7.91 | 0 | 7.91 | 0 | 0 |
| Nonenes | 0 | 0 | 0 | 0 | 2.98 | 0 | 2.98 | 0 | 0 |
| Decenes | 0 | 0 | 0 | 0 | 0 | 0 | 0 | 0 | 0 |
| Undecenes | 0 | 0 | 0 | 0 | 0 | 0 | 0 | 0 | 0 |
| Heavies | 0 | 0 | 0 | 0 | 0 | 0 | 0 | 0 | 0 |

|  | 71 | 77 | 81 | 83 | 84 | 88 | 89 | 90 | 91 |
|---|---|---|---|---|---|---|---|---|---|
| Hydrogen | 0 | 0 | 0 | 789.37 | 0 | 0 | 0 | 0 | 0 |
| Methane | 0 | 0 | 0 | 160.20 | 0 | 0 | 0 | 0 | 0 |
| Ethylene | 0 | 0 | 0 | 7.01 | 0 | 0 | 0 | 0.2 | 0 |
| Ethane | 0 | 0 | 0 | 0.29 | 0 | 0 | 0 | 0 | 0 |
| Propylene | 0 | 0 | 122.69 | 18.40 | 1.80 | 0 | 0 | 177.47 | 0 |
| Propane | 0 | 0 | 3.98 |  | 92.81 | 0 | 0 | 10.31 | 0 |
| Isobutane | 0.06 | 0.06 | 6.64 |  | 22.82 | 0 | 0 | 2.53 | 0 |
| Isobutylene | 0.38 | 0.38 | 85.28 |  | 1.01 | 0 | 0 | 98.18 | 0 |
| Butene-1 | 0.02 | 0.02 | 9.23 |  | 0.09 | 0 | 0 | 8.49 | 0 |
| Butadiene | 0 | 0 | 14.95 |  | 0 | 0.01 | 0 | 0 | 0 |
| Normal butane | 4.06 | 4.06 | 7.03 |  | 67.55 | 0 | 0 | 7.50 | 0 |
| Butene-2 | 8.40 | 8.40 | 47.66 |  | 0.63 | 0 | 0 | 57.78 | 0 |
| Isopentane | 1.20 | 1.20 | 0.63 |  | 4.50 | 0 | 0.01 | 0 | 0 |
| Isoprene | 0 | 539.70 | 0.50 |  | 0 | 518.20 | 1.70 | 0 | 19.30 |
| Normal pentane | 0.06 | 0.06 | 0 |  | 0.59 | 0 | 0.03 | 0 | 0 |
| Normal pentenes | 196.56 | 98.28 | 0.08 |  | 0.18 | 0.21 | 0.30 | 0.16 | 0 |
| Isopentenes | 1,453.56 | 726.78 | 3.97 |  | 2.52 | 4.58 | 6.22 | 3.06 | 0.94 |
| Piperylenes | 0 | 98.28 | 0 |  | 0 | 0.30 | 5.08 | 0 | 85.17 |
| Hexenes | 2.22 | 2.22 | 0 |  | 0 | 0 | 2.73 | 0 | 1.85 |
| Heptenes | 0 | 0 | 0 |  | 0 | 0 | 0 | 0 | 0 |
| Octenes | 0 | 0 | 0 |  | 0 | 0 | 0 | 0 | 0 |
| Nonenes | 0 | 0 | 0 |  | 0 | 0 | 0 | 0 | 0 |
| Decenes | 0 | 0 | 0 |  | 0 | 0 | 0 | 0 | 0 |
| Undecenes | 0 | 0 | 0 |  | 0 | 0 | 0 | 0 | 0 |
| Heavies | 0 | 0 | 0 |  | 0 | 0 | 0 | 0 | 0 |
| Carbon monoxide |  |  |  |  | 17.78 |  |  |  |  |
| Carbon dioxide |  |  |  |  | 120.04 |  |  |  |  |

TABLE

|  | 92 | 95 | 96 | 98 | 101 | 104 | 106 | 108 | 109 | 111 | 112 | 113 |
|---|---|---|---|---|---|---|---|---|---|---|---|---|
| Methane | 0 | 5.43 | 0 | 3.16 | 5.43 | 3.16 | 0 | 2.27 | 0 | 0 | 0 | 0 |
| Ethylene | 0 | 713.03 | 0 | 0.13 | 754.83 | 47.96 | 0 | 706.89 | 0 | 0 | 0 | 0 |
| Ethane | 0 | 39.44 | 0 | 0.09 | 39.97 | 0.63 | 0 | 39.34 | 0 | 0 | 0 | 0 |
| Propylene | 0 | 4,146.89 | 0 | 1,201.41 | 2,557.36 | 0.06 | 26.25 | 2,578.07 | 130.44 | 0 | 0 | 0 |
| Propane | 0 | 398.19 | 0 | 75.33 | 409.64 |  | 26.47 | 293.95 | 99.72 | 0 | 0 | 0 |
| Isobutane | 0 | 0.32 | 0 | 0.06 | 1.76 |  | 4.12 | 0.01 | 0.16 | 0 | 0 | 0 |
| Isobutylene | 0 | 0.62 | 0 | 0.09 | 637.12 |  | 727.78 | 0.38 | 5.46 | 1.68 | 0 | 0 |
| Butene-1 | 0 | 0.32 | 0 | 0.09 | 293.46 |  | 299.48 | 0.09 | 1.39 | 0.99 | 0 | 0 |
| Butadiene | 0 | 0.04 | 0 | 0.04 | 0.04 |  | 0.04 | 0 | 0 | 0 | 0 | 0 |
| Normal butane | 0 | 0.10 | 0 | 0.04 | 14.42 |  | 11.38 | 0 | 0.03 | 10.47 | 0.03 | 0 |
| Trans-butene-2 | 0 | 1.46 | 0 | 0 | 593.42 |  | 260.59 | 0.01 | 0.31 | 380.44 | 0.81 | 0 |
| Cis-butene-2 | 0 | 3.20 | 0 | 0 | 411.63 |  | 64.76 | 0 | 0.16 | 343.40 | 3.19 | 0 |
| 3-methyl-butene-1 | 0 | 18.44 | 0 | 0 | 18.94 |  | 0 | 0 | 0 | 0.49 | 18.03 | 0.04 |
| Isopentane | 0 | 10.77 | 0 | 0 | 11.10 |  | 0 | 0 | 0 | 0.03 | 10.74 | 0.03 |
| Pentane-1 | 0 | 28.39 | 0 | 0 | 28.82 |  | 0 | 0 | 0 | 0.03 | 27.94 | 0.08 |
| 2-methyl-butene-1 | 0 | 118.57 | 0 | 0 | 118.69 |  | 0 | 0 | 0 | 0.01 | 115.95 | 0.32 |
| Normal pentane | 0 | 10.84 | 0 | 0 | 11.18 |  | 0 | 0 | 0 | 0 | 10.84 | 0.03 |
| Trans-pentene-2 | 0 | 150.52 | 0 | 0 | 152.62 |  | 0 | 0 | 0 | 0 | 148.14 | 0.46 |
| Cis-pentene-2 | 0 | 54.06 | 0 | 0 | 54.81 |  | 0 | 0 | 0 | 0 | 53.20 | 0.16 |
| 2-methyl-butene-2 | 0 | 282.99 | 0 | 0 | 283.25 |  | 0 | 0 | 0 | 0 | 276.74 | 0.86 |
| C$_6$+ | 0 | 217.83 | 0 | 0 | 76.25 |  | 0 | 0 | 0 | 0 | 73.96 | 2.06 |
| Cat poly gas olefins | 316.25 | 1,272.90 | 0.25 | 0 | 986.50 |  | 0 | 0 | 0 | 0 | 956.90 | 28.12 |
| Cat poly gas saturates | 9.11 | 260.21 | 1.31 | 0 | 260.21 |  | 0 | 0 | 0 | 0 | 252.40 | 7.42 |
| Heavies | 4.56 | 0 | 6.04 | 0 | 1.53 |  | 0 | 0 | 0 | 0 | 1.48 | 0.05 |

The precise operating conditions for each of the catalytic units depends upon the specific catalyst utilized, as well as the precise nature of the individual feed streams. The separation steps of the process are, of course, greatly simplified in the drawings and example and can, in actual operation, represent either a greater or a smaller number of separation means such as fractionation, adsorption, and the like. Any convenient sequence of separation steps can be used. Conventional features such as pumps, heat exchangers, valves, heaters, and the like, have been

What is claimed is:
1. A process for converting n-butene and isobutene to produce isoamylene, comprising the steps of:
  converting n-butene and isobutene, the amount of isobutene being sufficient to produce substantial quantities of isoamylenes, in a first olefin reaction zone by the olefin reaction which, as defined herein, can be visualized as comprising the reaction between two first pairs of carbon atoms, the two carbon atoms of each first pair being connected by an ole- finic double bond, to form two new pairs from the carbon atoms of said first pairs, the two carbon atoms of each said new pairs being connected by an olefinic double bond, to produce a first stream comprising ethylene, isoamylene, and at least one heavier olefin;

separating in a separation zone said first stream to provide a second stream comprising said heavier olefin and said ethylene; and converting said second stream in a second olefin reaction zone to produce additional isoamylene.

2. The process of claim 1 wherein:

additional n-butene and isobutene are produced in the conversion of said second stream in said second olefin reaction zone, and said n-butene and isobutene are returned to said first olefin reaction zone for conversion therein.

3. The process of claim 2 wherein:

said first stream further includes propylene and said at least one heavier olefin is $C_6$ olefins, said propylene is included in said second stream and passed to said second olefin reaction zone, the effluent from said second olefin reaction zone is fed to said separation zone, and said n-butene and isobutene are removed from said separation zone and returned to said first olefin reaction zone.

4. The process of claim 1 wherein said n-butene is obtained by converting in an isomerization zone a stream comprising butene-1.

5. The process of claim 1 wherein said olefin reaction is carried out in the presence of an olefin double bond isomerization catalyst under conditions suitable for double bond isomerization and said olefin reaction.

6. The process of claim 1 wherein the amount of isobutene is at least about 50 mol percent based on the amount of n-butenes present.

References Cited

UNITED STATES PATENTS

| | | | |
|---|---|---|---|
| 2,985,696 | 5/1961 | Magness | 260—680 |
| 3,261,879 | 7/1966 | Banks | 260—683 |
| 3,457,320 | 7/1969 | Stapp et al. | 260—683 |

DELBERT E. GANTZ, Primary Examiner

C. E. SPRESSER, JR., Assistant Examiner